United States Patent
Yeh

(10) Patent No.: US 10,459,630 B2
(45) Date of Patent: Oct. 29, 2019

(54) MEMORY MANAGEMENT METHOD, MEMORY STORAGE DEVICE AND MEMORY CONTROLLING CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 118 days.

(21) Appl. No.: 14/519,138

(22) Filed: Oct. 21, 2014

(65) Prior Publication Data

US 2016/0054921 A1 Feb. 25, 2016

(30) Foreign Application Priority Data

Aug. 25, 2014 (TW) .............................. 103129175 A

(51) Int. Cl.
*G06F 3/06* (2006.01)
*G06F 11/10* (2006.01)

(52) U.S. Cl.
CPC .......... *G06F 3/0604* (2013.01); *G06F 3/0659* (2013.01); *G06F 3/0683* (2013.01); *G06F 11/10* (2013.01); *G06F 11/1048* (2013.01); *G06F 2211/007* (2013.01); *G06F 2212/401* (2013.01); *G06F 2212/402* (2013.01)

(58) Field of Classification Search
CPC ................. G06F 3/0604; G06F 3/0683; G06F 2211/007; G06F 2212/401; G06F 2212/402; G06F 12/0246; G06F 11/008
See application file for complete search history.

(56) References Cited

U.S. PATENT DOCUMENTS

| 2010/0037009 A1* | 2/2010 | Yano | G06F 12/0246 711/103 |
| 2010/0332923 A1* | 12/2010 | D'Abreu | G06F 11/1068 711/103 |
| 2012/0272123 A1* | 10/2012 | Yeh | G06F 12/0246 714/773 |
| 2012/0290798 A1* | 11/2012 | Huang | G06F 3/0608 711/154 |
| 2014/0122964 A1* | 5/2014 | Chen | H03M 13/05 714/758 |
| 2014/0146600 A1* | 5/2014 | Sohn | G11C 11/1697 365/158 |

(Continued)

*Primary Examiner* — Masud K Khan
(74) *Attorney, Agent, or Firm* — JCIPRNET

(57) ABSTRACT

A memory management method, a memory storage device and a memory controlling circuit unit are provided. The method includes: defining a first data management rule for a first type physical unit and a second data management rule for a second type physical unit, and a data density of the first type physical unit is lower than the data density of the second type physical unit; if a first physical unit belongs to the first type physical unit, managing the first physical unit according to the first data management rule to make the data stored in the first physical unit conforming to a first reliability level; and if the first physical unit belongs to the second type physical unit, managing the first physical unit according to the second data management rule to make the data stored in the first physical unit conforming to a second reliability level.

14 Claims, 9 Drawing Sheets

(56) References Cited

U.S. PATENT DOCUMENTS

2014/0189696 A1* 7/2014 Abellanas .................. G06F 1/26
                                                                                718/102
2015/0363126 A1* 12/2015 Frick ....................... G06F 1/266
                                                                                711/114

* cited by examiner

MEMORY MANAGEMENT METHOD, MEMORY STORAGE DEVICE AND MEMORY CONTROLLING CIRCUIT UNIT

CROSS-REFERENCE TO RELATED APPLICATION

This application claims the priority benefit of Taiwan application serial no. 103129175, filed on Aug. 25, 2014. The entirety of the above-mentioned patent application is hereby incorporated by reference herein and made a part of this specification.

BACKGROUND

1. Technology Field

The invention relates to a memory management mechanism, and particularly relates to a memory management method, a memory storage device, and a memory controlling circuit unit.

2. Description of Related Art

The markets of digital cameras, cellular phones, and MP3 players have expanded rapidly in recent years, resulting in an escalated demand for storage media by consumers. The characteristics of data non-volatility, low power consumption, and compact size make a rewritable non-volatile memory module (e.g. flash memory) ideal for being built in the aforesaid portable multi-media devices.

Generally speaking, for saving storage space, data to be written to the rewritable non-volatile memory module is compressed into compressed data having a smaller data size, and then the compressed data is written to the rewritable non-volatile memory module. After the compressed data being read, the compressed data is then decompressed. However, if there are errors in the compressed data, the errors may seriously lower the accuracy of data obtained by decompressing the compressed data.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a memory management method, a memory storage device, and a memory controlling circuit unit capable of enhancing protection to a specific region/data in a rewritable non-volatile memory module.

An exemplary embodiment of the invention provides a memory management method for controlling a rewritable non-volatile memory module including a plurality of physical units. The memory management method includes: defining a first data management rule for a first type physical unit and a second data management rule for a second type physical unit, wherein a first data density of the first type physical unit is lower than a second data density of the second type physical unit; managing a first physical unit of the physical units based on the first data management rule if the first physical unit belongs to the first type physical unit, such that data stored in the first physical unit conforms to a first reliability level; and managing the first physical unit based on the second data management rule if the first physical unit belongs to the second type physical unit, such that the data stored in the first physical unit conforms to a second reliability level, wherein the second reliability level is higher than the first reliability level.

An exemplary embodiment of the invention provides a memory storage device, including a connecting interface unit, a rewritable non-volatile memory module, and a memory controlling circuit unit. The connecting interface unit is configured to be coupled to a host system. The rewritable non-volatile memory module includes a plurality of physical units. The memory controlling circuit unit is coupled to the connecting interface unit and the rewritable non-volatile memory module, wherein the memory controlling circuit unit is configured to define a first data management rule for a first type physical unit and a second data management rule for a second type physical unit, wherein a first data density of the first type physical unit is lower than a second data density of the second type physical unit. If a first physical unit of the physical units belongs to the first type physical unit, the memory controlling circuit unit is further configured to manage the first physical unit based on the first data management rule, such that data stored in the first physical unit conforms to a first reliability level, and if the first physical unit of the physical units belongs to the second type physical unit, the memory controlling circuit unit is further configured to manage the first physical unit based on the second data management rule, such that the data stored in the first physical unit conforms to a second reliability level, wherein the second reliability level is higher than the first reliability level.

An exemplary embodiment of the invention provides a memory controlling circuit unit for controlling a rewritable non-volatile memory module including a plurality of physical units. The memory controlling circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface, wherein the memory management circuit is configured to define a first data management rule for a first type physical unit and a second data management rule for a second type physical unit, wherein a first data density of the first type physical unit is lower than a second data density of the second type physical unit. If a first physical unit of the physical units belongs to the first type physical unit, the memory management circuit is further configured to manage the first physical unit based on the first data management rule, such that data stored in the first physical unit conforms to a first reliability level, and if the first physical unit of the physical units belongs to the second type physical unit, the memory management circuit is further configured to manage the first physical unit based on the second data management rule, such that the data stored in the first physical unit conforms to a second reliability level, wherein the second reliability level is higher than the first reliability level.

Based on the above, in an exemplary embodiment of the invention, a protection level of data in a physical unit is based on a data density of the physical unit. Thus, a chance that an error occurs in data stored in a physical unit with a higher data density is reduced.

To make the above features and advantages of the present invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
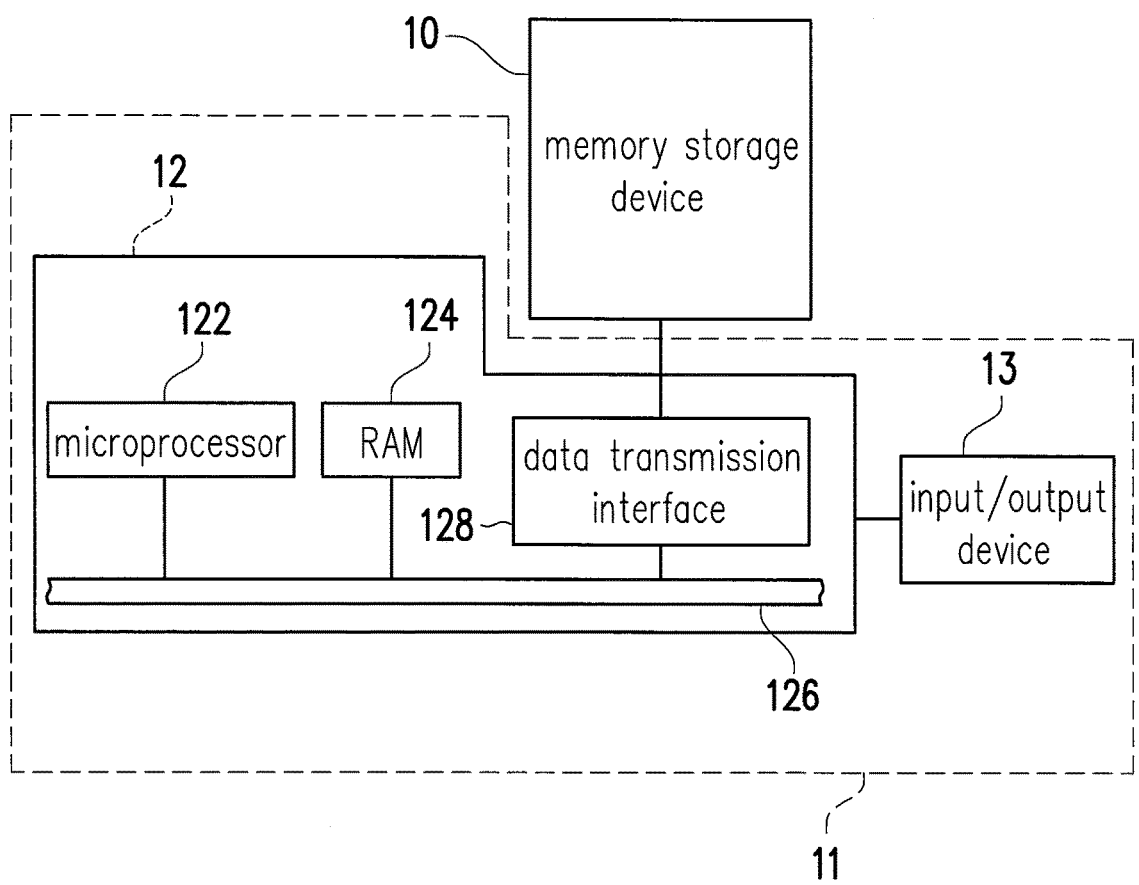
FIG. 1 is a diagram illustrating a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (i.e. a memory storage system) includes a rewritable non-volatile memory module and a controller (i.e. a control circuit). The memory storage device is usually used together with a host system, such that the host system is able to write data to or read data from the memory storage device.

Figure 2:
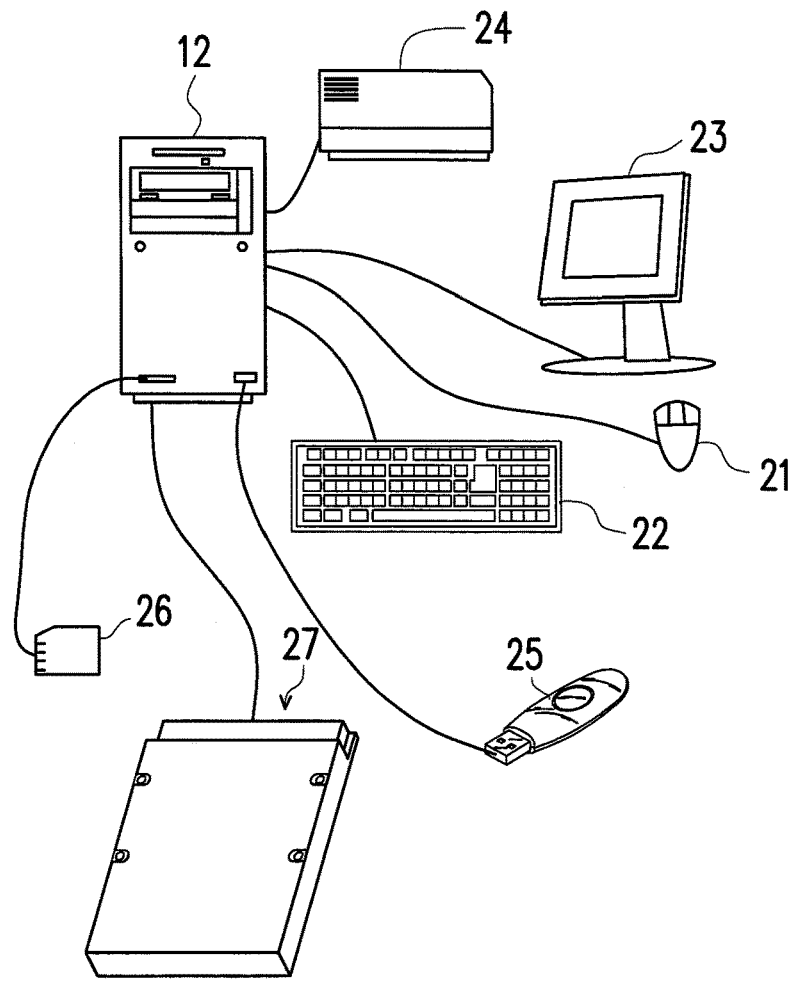
FIG. 2 is an exemplary schematic view illustrating a computer, an input/output device, and a memory storage device according to an exemplary embodiment of the invention.

FIG. 1 is an exemplary schematic view illustrating a host system and a memory storage device according to an exemplary embodiment of the invention. FIG. 2 is an exemplary schematic view illustrating a computer, an input/output device, and a memory storage device according to an exemplary embodiment of the invention.

Referring to FIG. 1, a host system 11 generally includes a computer 12 and an input/output (I/O) device 13. The computer 12 includes a microprocessor 122, a random access memory (RAM) 124, a system bus 126, and a data transmission interface 128. The input/output device 13 includes a mouse 21, a keyboard 22, a display 23 and a printer 24 as shown in FIG. 2. It should be understood that the devices illustrated in FIG. 2 are not intended to limiting the input/output device 13, and the input/output device 13 may further include other devices.

In an exemplary embodiment of the invention, the memory storage device 10 is coupled to other elements of the host system 11 through the data transmission interface 128. Through operation of the microprocessor 122, the random access memory 124 and the input/output device 13, the data is written to or read from the memory storage device 10. For example, the memory storage device 10 may be a rewritable non-volatile memory storage device, such as a flash drive 25, a memory card 26, or a solid state drive (SSD) 27, etc., as shown in FIG. 2.

Figure 3:
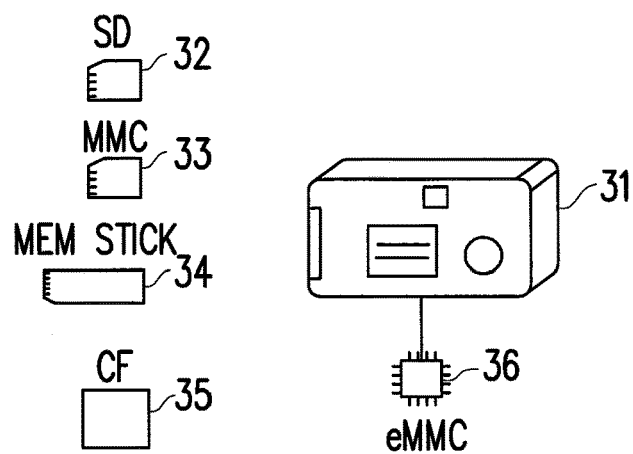
FIG. 3 is an exemplary schematic view illustrating a host system and a memory storage device according to an exemplary embodiment of the invention.

FIG. 3 is an exemplary schematic view illustrating a host system and a memory storage device according to an exemplary embodiment of the invention.

Generally speaking, the host system 11 is substantially any system used with the memory storage device 10 for storing data. Even though the host system 11 is described as a computer system in this exemplary embodiment, in another exemplary embodiment of the invention, the host system 11 may be a digital camera, a video camera, a communication device, an audio player, or a video player, etc. For example, if the host system 11 is a digital camera (video camera) 31, the rewritable non-volatile memory storage device is then a secure digital (SD) card 32, a multi-media card (MMC) 33, a memory stick 34, a compact flash (CF) card 35 or an embedded storage apparatus 36 (as shown in FIG. 3) used by the host system 11. The embedded storage device 36 includes an embedded MMC (eMMC). It should be mentioned that the eMMC is directly coupled to a substrate of the host system 11.

Figure 4:
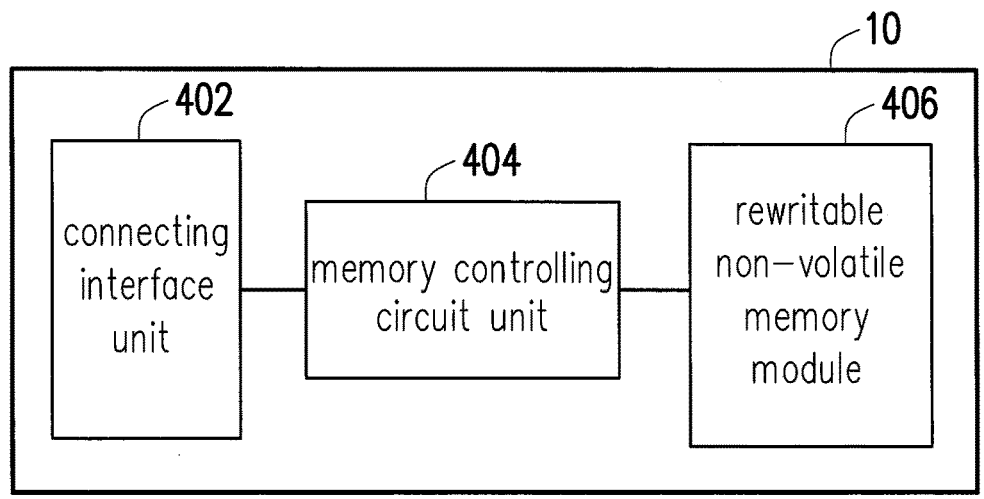
FIG. 4 is a schematic block diagram illustrating the memory storage device shown in FIG. 1.

FIG. 4 is a schematic block diagram illustrating the memory storage device shown in FIG. 1.

Referring to FIG. 4, the memory storage device 10 includes a connecting interface unit 402, a memory controlling circuit unit 404, and a rewritable non-volatile memory module 406.

In this exemplary embodiment, the connecting interface unit 402 complies with the serial advanced technology attachment (SATA) standard. However, it should be understood that the invention is not limited thereto. The connecting interface unit 402 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) interface standard, the ultra high speed-I (UHS-I) interface standard, the ultra high speed-II (UHS-II) interface standard, the memory stick (MS) interface standard, the multi-media card (MMC) interface standard), the embedded multimedia card (eMMC) interface standard, the universal flash storage (UFS) interface standard, the compact flash (CF) interface standard, the integrated device electronics (IDE) standard, or other suitable standards. The connecting interface unit 402 may be packaged in a chip with the memory controlling circuit unit 404, or the connecting interface unit 402 may be disposed separately from the chip including the memory controlling circuit unit 404.

The memory controlling circuit unit 404 is configured for executing a plurality of logical gates or control commands implemented in a hardware form or in a firmware form, and performing various operations, such as data writing, data reading or data erasing in the rewritable non-volatile memory module 406 according to the commands of the host system 11.

The rewritable non-volatile memory module 406 is coupled to the memory controlling circuit unit 404 and is configured to store data written by the host system 11. The rewritable non-volatile memory module 406 may be a single-level cell (SLC) NAND flash memory module, a multi-level cell (MLC) NAND flash memory module (i.e. a memory module where one memory cell stores two bits of data), a triple-level cell (TLC) NAND flash memory module (i.e. a memory module where a memory cell stores three bits of data), other flash memory modules or other memory modules having the same characteristics.

Figure 5:
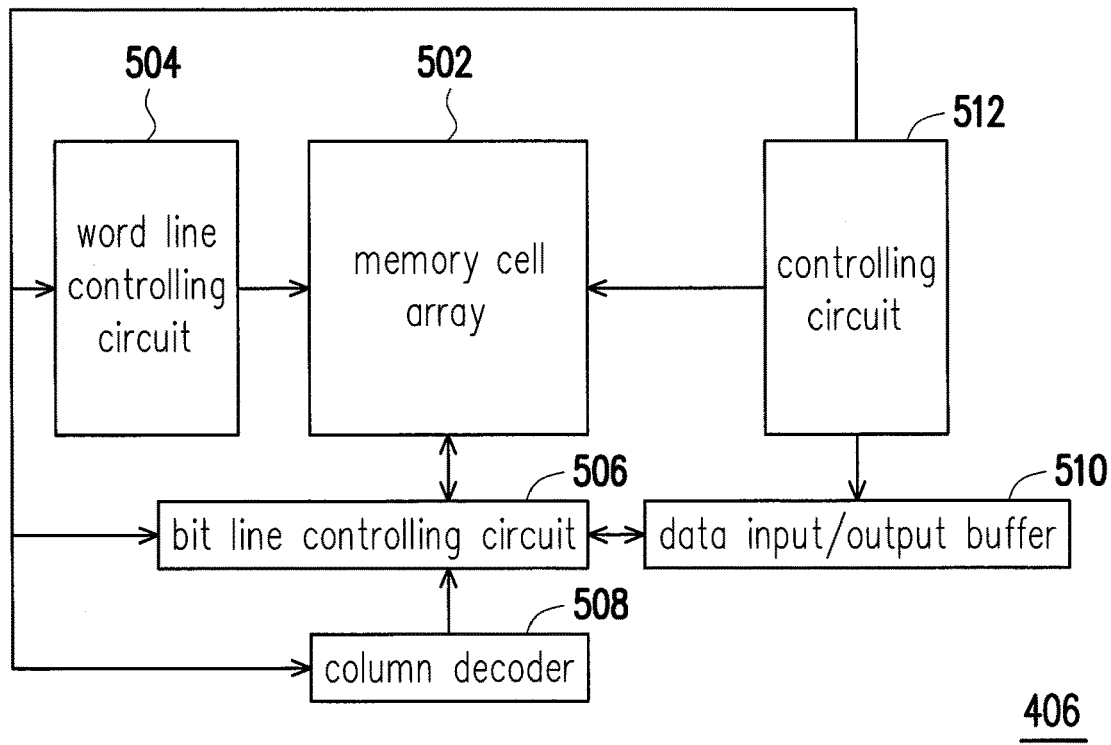
FIG. 5 is a schematic block diagram illustrating a rewritable non-volatile memory module according to an exemplary embodiment of the invention.
Figure 6:
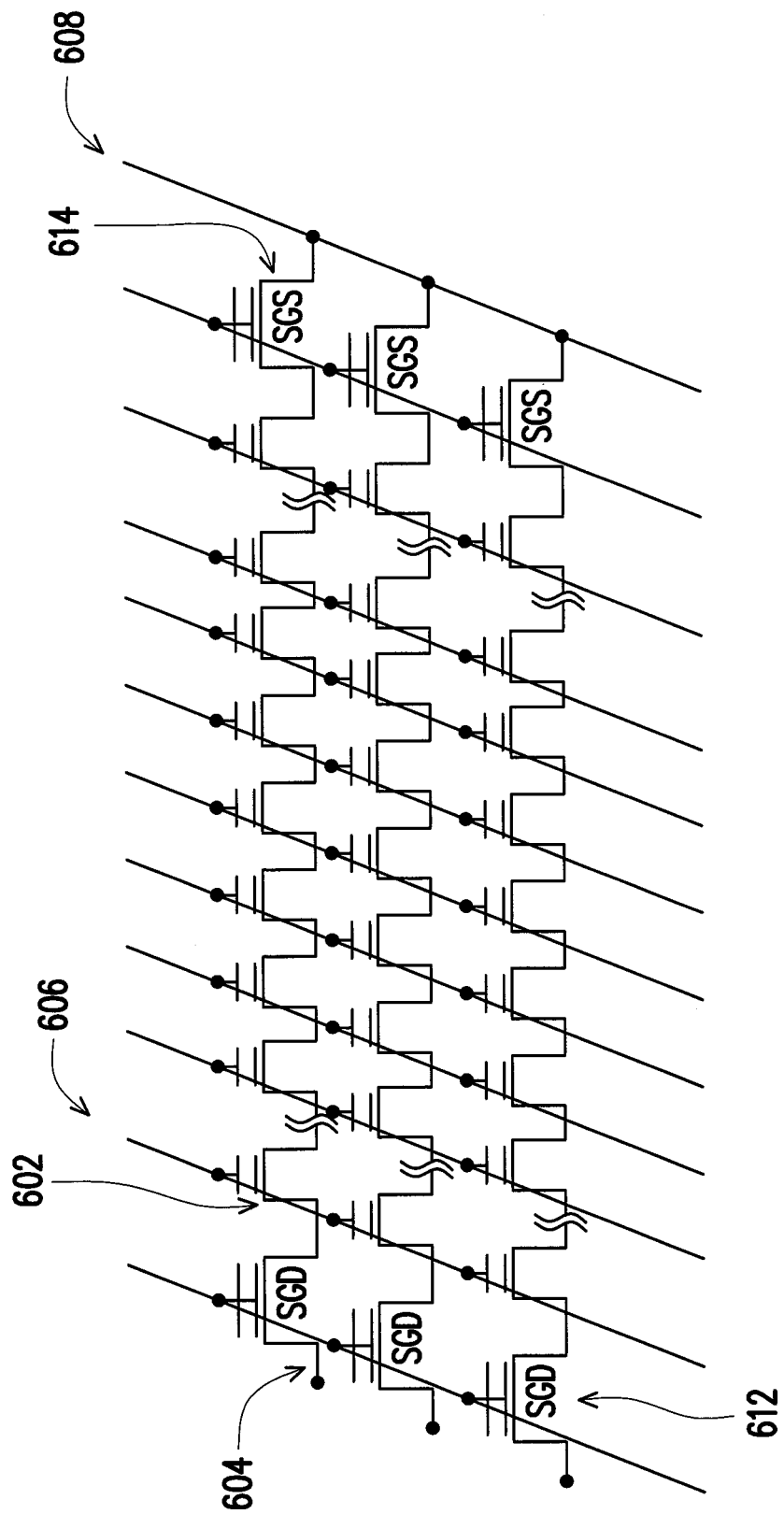
FIG. 6 is an exemplary schematic view illustrating a memory cell array according to an exemplary embodiment of the invention.

FIG. 5 is a schematic block diagram illustrating a rewritable non-volatile memory module according to an exemplary embodiment of the invention. FIG. 6 is an exemplary schematic view illustrating a memory cell array according to an exemplary embodiment of the invention.

Referring to FIG. 5, the rewritable non-volatile memory module 406 includes a memory cell array 502, a word line controlling circuit 504, a bit line controlling circuit 506, a column decoder 508, a data input/output buffer 510, and a controlling circuit 512.

In this exemplary embodiment, the memory cell array 502 includes a plurality of memory cells 602 for storing data, a plurality of select gate drain (SGD) transistors 612, a plurality of select gate source (SGS) transistors 614, and a plurality of bit lines 604, a plurality of word lines 606, and a common source line 608 for connecting the memory cells (as shown in FIG. 6). The memory cells 602 are disposed at intersections of the bit lines 604 and the word lines 606 and in an array arrangement (or a three-dimensional stacking arrangement). When the memory controlling circuit unit 404 receives a writing command or a reading command, the controlling circuit 512 controls the word line controlling circuit 504, the bit line controlling circuit 506, the column decoder 508, the data input/output buffer 510 to write data to or read data from the memory cell array 502. Here, the word line controlling circuit 504 is configured to control a voltage applied to the word lines 606, the bit line controlling circuit 506 is configured to control a voltage applied to the bit lines 604, the column decoder 508 is configured to select the corresponding bit line based on a column address in the command, and the data input/output buffer 510 is configured to temporarily storage data.

Each of the memory cells in the rewritable non-volatile memory module 406 may store one or more bits by changing a threshold voltage of the memory cell. More specifically, in each of the memory cells, a charge trapping layer is provided between a control gate and a channel. Amount of electrons in the charge trapping layer may be changed by applying a write voltage to the control gate thereby changing the threshold voltage of the memory cell. This procedure of changing the threshold voltage is also known as "writing data into the memory cell" or "programming the memory cell". Each of the memory cells in the memory cell array 502 has a plurality of storage statuses depended on changes in the threshold voltage. Moreover, which of the storage statuses is the memory cell belong to may be determined by reading voltages, so as to obtain the one or more bits stored in the memory cell.

Figure 7:
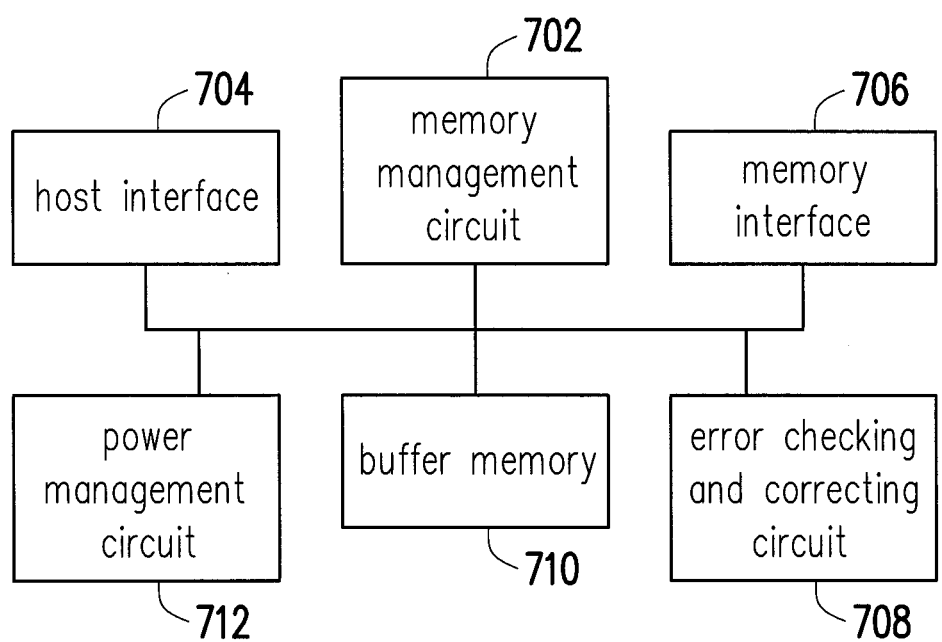
FIG. 7 is a schematic block diagram illustrating a memory controlling circuit unit according to an exemplary embodiment of the invention.

FIG. 7 is a schematic block diagram illustrating a memory controlling circuit unit according to an exemplary embodiment of the invention.

Referring to FIG. 7, the memory controlling circuit 404 includes a memory management circuit 702, a host interface 704, a memory interface 706, and an error checking and correcting circuit 708.

The memory management circuit 702 is configured to control overall operations of the memory controlling circuit unit 404. Specifically, the memory management circuit 702 has a plurality of control commands. During operations of the memory storage device 10, the control commands are executed to perform various operations such as writing, reading and erasing data. Operations of the memory management circuit 702 are similar to the operations of the memory controlling circuit unit 404, thus related description is omitted hereinafter.

In the present exemplary embodiment, the control commands of the memory management circuit 702 are implemented in a form of a firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, the system area in a memory exclusively used for storing system data) of the rewritable non-volatile memory module 406. In addition, the memory management circuit 702 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 702 when the memory controlling circuit unit 404 is enabled. Next, the control commands are executed by the microprocessor unit to perform operations of writing, reading or erasing data.

Further, in another exemplary embodiment, the control commands of the memory management circuit 702 may also be implemented in a form of hardware. For example, the memory management circuit 702 includes a microcontroller, a memory writing unit, a memory reading unit, a memory erasing unit and a data processing unit. The memory management unit, the memory writing unit, the memory reading unit, the memory erasing unit and the data processing unit are coupled to the microprocessor. The memory management unit is configured to manage the physical erasing units of the rewritable non-volatile memory module 406; the memory writing unit is configured to issue a write command to the rewritable non-volatile memory module 406 in order to write data to the rewritable non-volatile memory module; the memory reading unit is configured to issue a read command to the rewritable non-volatile memory module 406 in order to read data from the rewritable non-volatile memory module 406; the memory erasing unit is configured to issue an erase command to the rewritable non-volatile memory module 406 in order to erase data from the rewritable non-volatile memory module 406; the data processing unit is configured to process both the data to be written to the rewritable non-volatile memory module 406 and the data to be read from the rewritable non-volatile memory module 406.

The host interface 704 is coupled to the memory management circuit 702 and configured to receive and identify commands and data sent from the host system 11. Namely, the commands and data sent from the host system 11 are passed to the memory management circuit 702 through the host interface 704. In the present exemplary embodiment, the host interface 704 is compatible to a SATA standard. However, it should be understood that the present invention is not limited thereto, and the host interface 704 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 706 is coupled to the memory management circuit 702 and configured to access the rewritable non-volatile memory module 406. That is, data to be written to the rewritable non-volatile memory module 406 is converted to a format acceptable to the rewritable non-volatile memory module 406 through the memory interface 706. Specifically, if the memory management circuit 702 intends to access the rewritable non-volatile memory module 406, the memory interface 706 sends corresponding command sequences. The command sequences may include one or more signals, or data from the bus. For example, in a read command sequence, information such as identification codes and memory addresses are included.

The error checking and correcting circuit 708 is coupled to the memory management circuit 702 and configured to execute an error checking and correcting process to ensure the correctness of data. Specifically, when the memory management circuit 702 receives the writing command from the host system 11, the error checking and correcting circuit 708 generates an error correcting code (ECC) and/or an error detecting code (EDC) for data corresponding to the writing command, and the memory management circuit 702 writes data and the ECC and/or the EDC corresponding to the writing command to the rewritable non-volatile memory module 406. Subsequently, when the memory management circuit 702 reads the data from the rewritable non-volatile memory module 406, the corresponding ECC and/or the EDC is also read from the rewritable non-volatile memory module 406, and the error checking and correcting circuit 708 executes the error checking and correcting procedure for the read data based on the ECC and/or the EDC.

In an exemplary embodiment, the memory controlling circuit unit 404 further includes a buffer memory 710 and a power management circuit 212.

The buffer memory 710 is coupled to the memory management circuit 702 and configured to temporarily store data and commands from the host system 11 or data from the rewritable non-volatile memory module 406.

The power management unit 712 is coupled to the memory management circuit 702 and configured to control a power of the memory storage device 10.

Figure 8:
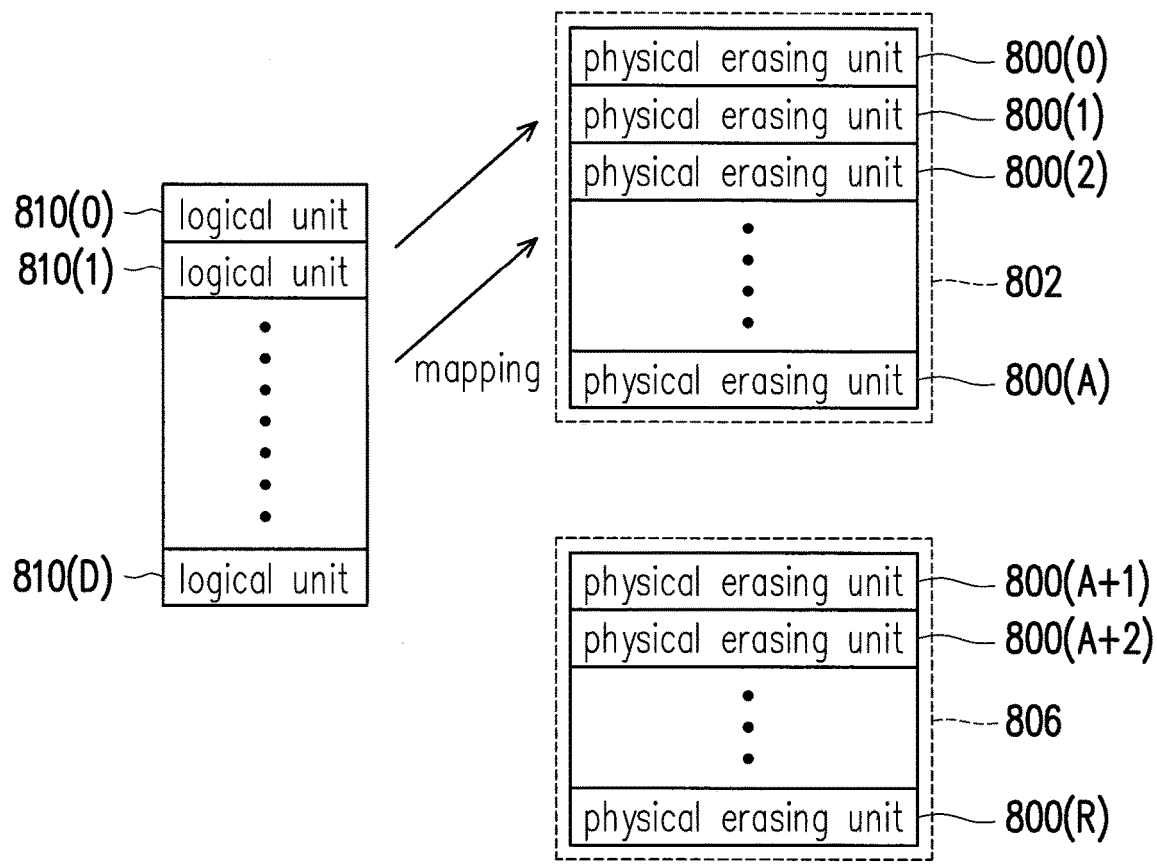
FIG. 8 is an exemplary schematic view illustrating managing a rewritable non-volatile memory module according to an exemplary embodiment of the invention.

FIG. 8 is an exemplary schematic view illustrating managing a rewritable non-volatile memory module according to an exemplary embodiment of the invention. It should be understood that when describing operations of the physical erasing unit of the rewritable non-volatile memory module 406 herein, terms such as "select", "group", "divide", "associate", etc. for operating the physical erasing unit are referred to as logical concepts. In other words, a physical position of the physical erasing unit of the rewritable non-volatile memory module does not change, and operations are performed with the physical erasing unit of the rewritable non-volatile memory module logically.

The memory cells of the rewritable non-volatile memory module 406 constitute a plurality of physical programming units, and the physical programming units constitute a plurality of physical erasing units. Specifically, the memory cells on the same word line constitute one or more physical programming units. If each memory cell is capable of storing two or more bits, the physical programming units on the same word line may be categorized into lower and upper physical programming units. For example, an LSB of each memory cell belongs to the lower physical programming units, and an MSB of each memory cell belongs to the upper physical programming units. Generally, in a MLC NAND flash memory, a writing speed of the lower physical programming units is greater than a writing speed of upper physical programming units, or reliability of the lower physical programming units is higher than reliability of the upper physical programming units. In the present exemplary embodiment, each physical programming unit is the smallest unit for programming. In other words, each physical programming unit is the smallest unit for writing data. For instance, the physical programming units may be physical pages or physical sectors. In case the physical programming units are the physical pages, each physical programming unit generally includes a data bit area and a redundant bit area. The data bit area includes a plurality of physical sectors for storing data of users, and the redundant bit area is configured for storing system data (e.g., error correcting codes). In the present exemplary embodiment, each data bit area contains 32 physical sectors, and a size of each physical sector is 512 bytes (512B). However, in other exemplary embodiments, the data bit area may contain 8, 16, or a greater or a smaller number of physical sectors, and the present invention is not intended to limit the number and the size of the physical sectors. On the other hand, each physical erasing unit is the smallest unit for erasing. Namely, each physical erasing unit has the least number of memory cells to be erased altogether. For instance, a physical erasing unit is a physical block.

Referring to FIG. 8, the memory management circuit 702 may logically divide physical erasing units 800(0) to 800(R) of the rewritable non-volatile memory module 406 into a plurality of regions, such as a storage region 802 and a system region 806.

Physical erasing units in the storage region 802 are configured to store the data from the host system 11. The storage region 802 stores valid data and invalid data. For example, when the host system 11 intends to delete valid data, the data being deleted may still be stored in the storage region 802 but marked as invalid data. A physical erasing unit not storing the valid data is referred as a spare physical erasing unit. For example, the physical erasing unit being erased becomes the spare physical erasing unit. If any physical erasing unit in the storage region 802 or the system region 806 is damaged, physical erasing units in the storage region 802 may also be used to replace the damaged physical erasing unit. If there is no physical erasing unit to replace the damaged physical erasing unit in the storage region 802, the memory management circuit 702 then declares that the whole memory storage device 10 is in a write protect state that is unable to write data any further. Besides, a physical erasing unit that stores valid data is also referred as a non-spare physical erasing unit.

The physical erasing units in the system region 806 are configured to record system data. The system data include a manufacturer and model of a memory chip, the number of physical erasing units of the memory chip, and the number of physical programming units of each physical erasing unit.

The number of the physical erasing units in the storage region 802 and the system region 806 may changes based on different memory specifications. Also, it should be understood that in the operation of the memory storage device 10, grouping of the physical erasing units associated with the storage region 802 and the system region 806 change dynamically. For example, if a physical erasing unit in the system region 806 is damaged and replaced by a physical erasing unit in the storage region 802, the physical erasing unit originally in the storage region 802 is thus associated with the system region 806.

The memory management circuit 702 configures logical units 810(0) to 810(D) to map the physical erasing units 800(0) to 800(A) in the storage region 802. For example, in the exemplary embodiment, the host system 11 accesses data in the storage region 802 through logical addresses. Therefore, each of the logical units 810(0) to 810(D) refers to a logical address. In addition, in an exemplary embodiment, each of the logical units 801(0) to 810(D) may also refer to a logical sector, a logical programming unit, a logical erasing unit, or be constituted of a plurality of continuous logical addresses. Each of the logical units 810(0) to 810(D) is mapped to one or more physical units. In this exemplary embodiment, a physical unit refers to a physical erasing unit. However, in another exemplary embodiment, a physical unit may be a physical address, a physical sector, a physical programming unit, or be constituted of a plurality of continuous physical addresses, the invention is not limited thereto. The memory management circuit 702 records a mapping relationship between the logical units and physical units in one or more logical-to-physical mapping tables. When the host system 11 intends to read data from or write data to the memory storage device 10, the memory management circuit 702 may perform data access of the memory storage device 10 based on the logical-to-physical mapping table.

In this exemplary embodiment, the memory management circuit 702 determines whether a physical unit (i.e. a first physical unit) belongs to a first type physical unit or a second type physical unit. For the ease of description, at least one exemplary embodiment of the invention is described in the following assuming that a physical erasing unit is referred as a physical unit. The memory management circuit 702 determines whether a physical erasing unit (i.e. a first physical erasing unit) belongs to a first type physical erasing unit or a second type physical erasing unit. For example, the memory management circuit 702 may determine whether the first physical erasing unit belongs to the first type physical erasing unit or the second type physical erasing unit based on a data density of the first physical erasing unit. If a physical erasing unit belongs to the first type physical erasing unit, a data density (i.e. a first data density) of the physical erasing unit is lower than a data density (i.e. a second data density) of another physical erasing unit belonging to the second type physical erasing unit.

In an exemplary embodiment, a data density of a physical erasing unit is related to the number and/or data length of logical units corresponding to data stored in the physical erasing unit. For example, the data density of a physical erasing unit is positively correlated with the number and/or data length of logical units corresponding to the data stored in the physical erasing unit. In other words, if the logical units to which data stored in a physical erasing unit corresponds are more, and/or if the data length of the logical units corresponding to the data is longer, the data density of the physical erasing unit is higher. If the logical units to which the data stored in a physical erasing unit corresponds are fewer, and/or the data length of the logical units corresponding to the physical erasing unit is shorter, the data density of the physical erasing unit is lower. It should be noted that in the exemplary embodiment of the invention, the number and the data length of the logical units corresponding to the data described herein are the total number and total data length (or total capacity) of all the logical units corresponding to the data, respectively. For example, if data storing in and filling the physical erasing unit is corresponding to 512 logical units and each of the 512 logical units has a data length of 4 KB, it represents that the number of the logical units corresponding to the data stored in the physical erasing unit is 512, and a data length of the logical units is 2048 KB. In addition, the number of logical units corresponding to data stored in a physical erasing unit may be an arbitrary real number. For example, if the host system 11 intends to store data having a data length of 5 KB into the rewritable non-volatile memory module 406, then the data may only use one and a quarter logical units (assuming a data length of a logical unit is 4 KB); after the data is written to the rewritable non-volatile memory module 406, the data corresponds to one and a quarter logical units. In another exemplary embodiment, the number and the data length of logical units may be referred to the total number and the total data length of logical units corresponding to the valid data or data with some specific types (e.g. system data or user data), respectively.

In an exemplary embodiment, a data density of a physical erasing unit may be related to whether data stored in this physical erasing unit is compressed and/or a degree of compression. For example, a data density of a physical erasing unit storing compressed data is higher than that of a physical erasing unit storing uncompressed data, and/or a data density of a physical erasing unit storing more compressed data is higher than that of a physical erasing unit storing less compressed data. In addition, a data density of a physical erasing unit storing strongly compressed data may be higher than that of a physical erasing unit storing lightly compressed data. For example, if data having an initial size of two or more logical units are compressed into one or less than one logical unit, such compression may be deemed as strong compression. If data having the initial size of two or more logical units is merely compressed into 1.5 logical units, such compression may be deemed as light compression. However, strong compression and light compression are relative concepts and shall not be limited to the above. In addition, coding of data may also increase or decrease a data length of data to be written to the rewritable non-volatile memory module 406. In an exemplary embodiment, a data density of a physical erasing unit may be relevant to whether data stored in the physical erasing unit is coded and/or how the data are coded. For example, for a physical erasing unit storing coded data, if a data length of the coded data is shorter than that of the data before being coded, then a physical density of the physical erasing unit may be higher, similar to the concept of compression above. However, to meet some special purposes, data may be coded to increase a data length thereof before being written to the rewritable non-volatile memory module 406. Thus, contrary to the concept of compression, when the coded data is written to a physical erasing unit of the non-volatile memory module 406, a data density of the physical erasing unit may be reduced. In other words, if a data length of data is shortened after the data being compressed or coded, the data density of the data is higher; and after the compressed or coded data being written to a physical erasing unit of the rewritable non-volatile memory module 406, a data density of the physical erasing unit may be increased. On the contrary, if a data length of data is lengthened after the data being compressed or coded, a data density of the data is lower; and after the compressed or coded data is written to a physical erasing unit of the rewritable non-volatile memory module 406, a data density of the physical erasing unit may be decreased.

Figure 9:
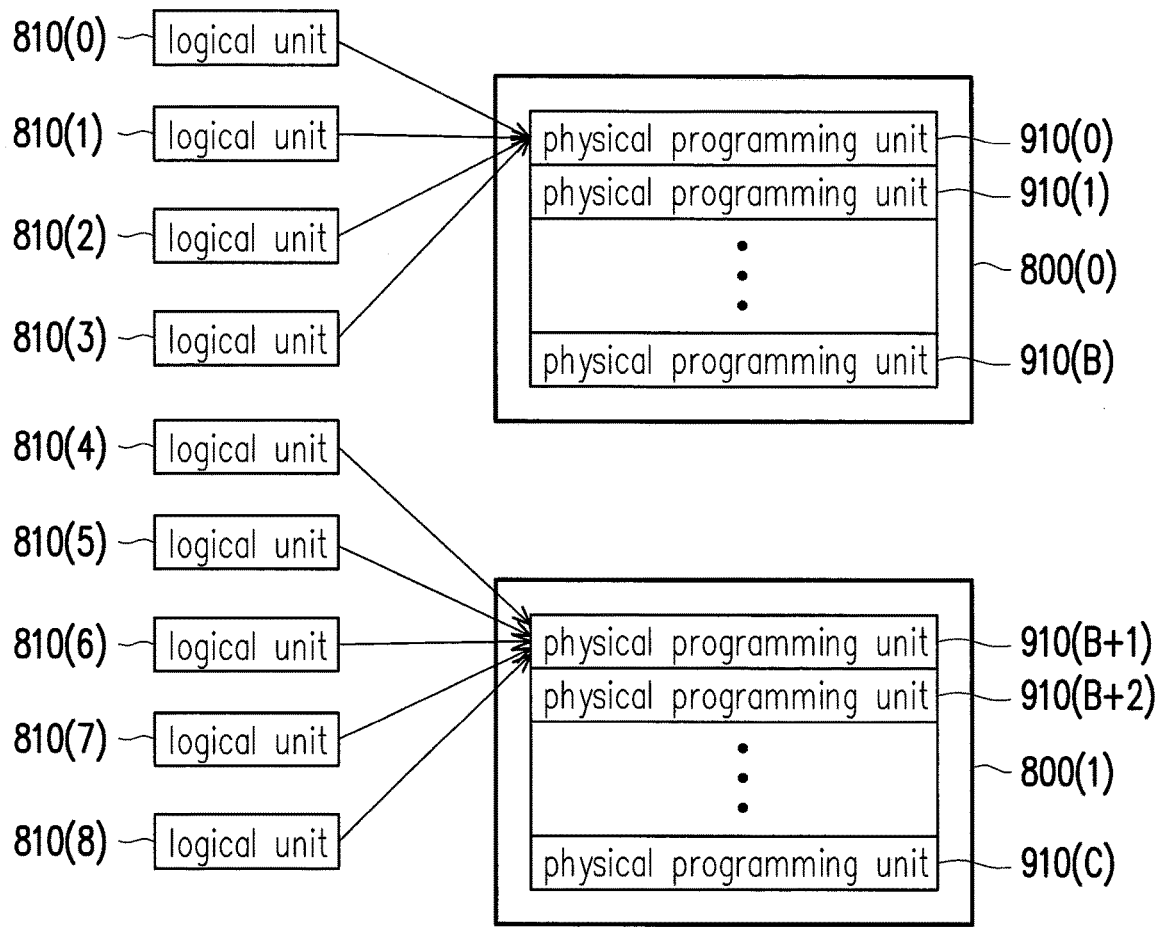
FIG. 9 is an exemplary schematic view illustrating mapping logical units to physical units according to an exemplary embodiment of the invention.

FIG. 9 is an exemplary schematic view illustrating managing physical units according to an exemplary embodiment of the invention.

Referring to FIG. 9, the physical erasing unit 800(0) includes physical programming units 910(0) to 910(B), and the physical erasing unit 800(1) includes physical programming units 910(B+1) to 910(C). In this exemplary embodiment, a data length of a physical programming unit is equivalent to a data length of four logical units. For example, a data length of a physical programming unit is 16 KB, and a data length of a logical unit is 4 KB. Assuming that data belonging to the logical units 810(0) to 810(3) are not compressed, not coded, or are compressed and/or coded but a data length thereof remains the same before being written to the rewritable non-volatile memory module 406, then after the data belonging to the logical units 810(0) to 810(3) are written into the physical programming unit 910(0), the data stored in the physical programming unit 910(0) corresponds to four logical units (i.e. the logical units 810(0) to 810(3)). Alternatively, assuming that data belonging to the logical units 810(4) to 810(8) are compressed and/or coded to shorten a data length thereof before being written to the rewritable non-volatile memory module 406, e.g. being reduced to the data length of a physical programming unit, then after the data belonging to the logical units 810(4) to 810(8) are written to the physical programming unit 910(B+1), the data stored in the physical programming unit 910(B+1) corresponds to five logical units (i.e. the logical units 810(4) to 810(8)). In this case, the data stored in the physical programming unit 910(0) corresponds to the data length of four logical units, while the data stored in the physical programming unit 910(B+1) corresponds to the data length of five logical units; also, a data density of the physical programming unit 910(B+1) is higher than a data density of the physical programming unit 910(0). In this exemplary embodiment, the physical programming unit 910(0) may be identified as a first type physical programming unit, while the physical programming unit 910(B+1) may be identified as a second type physical programming unit. In addition, based on a characteristic of the data and/or a compression/coding algorithm being used, data lengths of the data belonging to the logical units 810(4) to 810(8) may be the same or different after the data belonging to the logical units 810(4) to 810(8) are compressed or coded.

Figure 10:
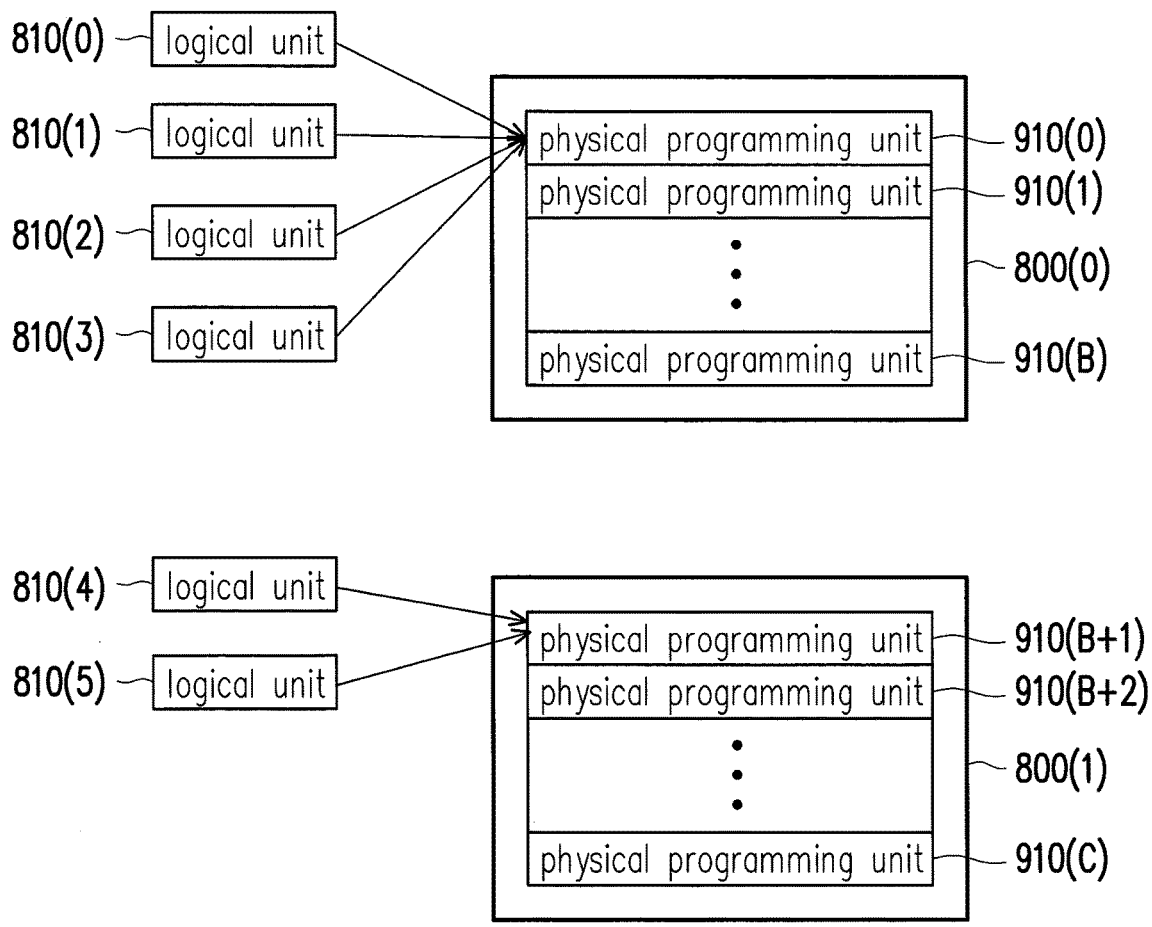
FIG. 10 is an exemplary schematic view illustrating mapping logical units to physical units according to another exemplary embodiment of the invention.

FIG. 10 is an exemplary schematic view illustrating mapping logical units to physical units according to an exemplary embodiment of the invention.

Referring to FIG. 10, the difference between this exemplary embodiment and the exemplary embodiment shown in FIG. 9 is that, assuming that the data belonging to the logical units 810(4) to 810(5) are compressed or coded to lengthen the data length thereof before being written to the rewritable non-volatile memory module 406, e.g. increasing the data length thereof to the data length of a physical programming unit, then after the data belonging to the logical units 810(4) to 810(5) are written to the physical programming unit 910(B+1), the data stored in the physical programming unit 910(B+1) correspond to two logical units (i.e. the logical units 810(4) and 810(5)). In this case, the data stored in the physical programming unit 910(0) corresponds to the data length of four logical units, while the data stored in the physical programming unit 910(B+1) corresponds to the data length of two logical units; also, the data density of the physical programming unit 910(0) is higher than the data density of the physical programming unit 910(B+1). In this exemplary embodiment, the physical programming unit 910(0) may be identified as the second type physical programming unit, while the physical programming unit 910(B+1) may be identified as the first type physical programming unit. Alternatively, the physical programming units 910(0) and 910(B+1) may both be identified as the first type physical programming unit. In addition, the respective data lengths of the data belonging to the logical units 810(4) to 810(5) may be the same or different after data belonging to the logical units 810(4) to 810(5) are compressed or coded.

The memory management circuit 702 may determine a data density of a physical unit or directly determine whether the physical unit belongs to the first type physical unit or the second type physical unit based on information such as the number and/or data length of one or more logical units corresponding to data in the physical unit and/or whether a data length of the data is lengthened or shortened after the data being compressed or coded. For example, the memory management circuit 702 may determine whether data stored in each or most of the physical programming units belonging to the same physical erasing unit corresponds to N or less than N logical units (N=4, for example), whether the total number of logical units corresponding to the data stored in the physical erasing unit is less than a predetermined number, whether a total data length of the logical units corresponding to the data stored in the physical erasing unit is less than a predetermined length, whether most of the data stored in the physical erasing unit are not coded or compressed, and/or whether most of the data stored in the physical erasing unit has longer data length than that the data length of the data before being compressed or coded. If at least one of the conditions above is met (i.e. a result of determining is "true"), the memory management circuit 702 may identify the physical erasing unit as the first type physical erasing unit. Alternatively, if none of the conditions above is met, the physical erasing unit may be identified as the second type physical erasing unit. Taking FIG. 9 as an example, in an exemplary embodiment, if a data length of a physical programming unit is equal to the data length of four logical units, a predetermined number for the physical erasing unit 800(0) may be "B*4", and a predetermined number for the physical erasing unit 800(1) may be "(C−B)*4", while "B" may or may not be equal to "C−B". The memory management circuit 702 may use at least one or all of the determining conditions above, the invention is not limited thereto. Besides, above information concerning whether a physical unit belongs to the first type physical unit or the second type physical unit may be recorded in one or more lookup tables, for example, for retrieval of the memory management circuit 702.

It should be noted that, in the exemplary embodiments above, it is assumed that information concerning the number and/or data length of the logical units corresponding to the data stored in each physical unit is available to the memory management circuit 702. However, in an exemplary embodiment, the information concerning the number and/or data length of the logical units corresponding to the data stored in each physical unit may not be available to the memory management circuit 702. In this case, the memory management circuit 702 may determine whether the first physical unit is the first type physical unit or the second type physical unit based on a value of valid count (valid_count) of the first physical unit. For example, the value of the valid count may be positively or negatively correlated with the data density of the first physical unit. Taking the data density of the first physical unit being positively correlated with the value of the valid count for example, the memory management circuit 702 determines whether a value of the valid count of the first physical unit exceeds a threshold value. If the value of the valid count exceeds the threshold value, the memory management circuit 702 determines that the first physical unit belongs to the second type physical unit. If the value of the valid count does not exceed the threshold value, the memory management circuit 702 determines that the first physical unit belongs to the first type physical unit. In other words, the valid count described herein may be used to evaluate the number and/or the data length of logical units corresponding to the data stored in a physical unit and/or whether a data length of the data is lengthened or shortened after the data being compressed or coded.

In this exemplary embodiment, the memory management circuit 702 may determine whether a physical unit belongs to the first type physical unit or the second type physical unit at any time point. However, in another exemplary embodiment, the memory management circuit 702 only makes such decision at some specific time points. For example in an exemplary embodiment, when the memory management circuit 702 performs a process associated with accessing data of a specific physical unit, such as a garbage collection process or a data writing process, the memory management circuit 702 may make such decision for the specific physical unit. For example, in an exemplary embodiment, when the garbage collection process is performed, the memory management circuit 702 determines whether the first physical unit belongs to the first type physical unit or the second type physical unit. The first physical unit here serves to store valid data collected in the garbage collection process. For example, the memory management circuit 702 may determine whether the first physical unit serving to store the collected valid data belongs to the first type physical unit or the second type physical unit before the garbage collection process is performed, after the garbage collection process is performed, or simultaneously during the garbage collection process. Alternatively, in another exemplary embodiment, when a data writing process requested by the host system 11 is performed, the memory management circuit 702 determines whether the first physical unit belongs to the first type physical unit or the second type physical unit. Here, the first physical unit serves to store write data corresponding to the data writing process. Similarly, the memory management circuit 702 may determine whether the first physical unit serving to store the write data belongs to the first type physical unit or the second type physical unit before performing the data writing process requested by the host system 11, after performing the data writing process requested by the host system 11, or simultaneously during the data writing process requested by the host system 11. It should be noted that the decision described herein may further includes an operation such as checking a lookup table to obtain information as required. The lookup table here stores in advance information concerning data density, such as whether a physical unit belongs to the first type physical unit or the second type physical unit, a valid count of a physical unit, the number and/or data length of logical units corresponding to data stored in a physical unit, or whether the data is compressed or coded, for example.

After the memory management circuit 702 obtains that the physical unit belongs to the first type physical unit or the second type physical unit, the memory management circuit 702 may use the physical unit by executing a corresponding operation. For example, the memory management circuit 702 may store valid data from the first type physical units or data having a lower data density (e.g. data that are not compressed or coded or data whose length is increased after being compressed or coded) in a physical unit that is already identified as or about to be identified as the first type physical unit, and store valid data from the second type physical units or data having a higher data density (e.g. data whose length is decreased after being compressed or coded) in another physical unit that is already identified as or about to be identified as the second type physical unit. In this way, the memory management circuit 702 is allowed to manage data with higher and lower data densities separately.

For example, the garbage collection process is to copy valid data in one or more physical erasing units (i.e. non-spare physical erasing unit) to another one or more physical erasing units. Thus, in an exemplary embodiment, assuming that the first physical erasing unit serves to store the collected valid data, and the physical erasing units 800(0) to 800(2) in FIG. 8 are the non-spare physical erasing units, the memory management circuit 702 may determine whether each physical programming unit (i.e. a first physical programming unit) storing the valid data in the physical erasing units 800(0) to 800(2) belongs to the first type physical programming unit or the second type physical programming unit when performing the garbage collection process. Here, a data density of the first type physical programming unit is lower than a data density of the second type physical programming unit. A mechanism for determining the first and second type physical programming units is similar to that for determining the first and second type physical erasing units, so no further details in this respect will be reiterated below. If the first physical programming unit belongs to the first type physical programming unit, the memory management circuit 702 does not copy the valid data stored in the first physical programming unit to the first physical erasing unit. For example, the memory management circuit 702 may copy the valid data stored in the first physical programming unit to another physical erasing unit for storing the collected data. If the first physical programming unit is belonging to the second type physical programming unit, the memory management circuit 702 may then copy the valid data stored in the first physical programming unit to the first physical erasing unit. Alternatively, in another exemplary embodiment, if the first physical programming unit belongs to the first type physical programming unit, the memory management circuit 702 may copy the valid data stored in the first physical programming unit to the first physical erasing unit. If the first physical programming unit belongs to the second type physical programming unit, the memory management circuit 702 may not copy the valid data stored in the first physical programming unit to the first physical erasing unit. Accordingly, when performing the garbage collection process, the memory management circuit 702 may copy the valid data from the first type physical programming unit to a specific physical erasing unit, and copy the valid data from the second type physical programming unit to another physical erasing unit.

In an exemplary embodiment, assuming that the first physical erasing unit serves to store the collected valid data, and the physical erasing unit 800(0) shown in FIG. 8 is the non-spare physical unit, the memory management circuit 702 may determine whether the physical erasing unit 800(0) belongs to the first type physical erasing unit or the second type physical erasing unit when performing the garbage collection process. If the physical erasing unit 800(0) belongs to the first type physical erasing unit, the memory management circuit 702 does not copy the valid data stored in the physical erasing unit 800(0) to the first physical erasing unit. For example, the memory management circuit 702 may copy the valid data stored in the physical erasing unit 800(0) to another physical erasing unit for storing the collected valid data. If the physical erasing unit 800(0) belongs to the second type physical erasing unit, the memory management circuit 702 may then copy the valid data stored in the physical erasing unit 800(0) to the first physical erasing unit. Alternatively, the memory management circuit 702 may merely copy the valid data from the first type physical erasing unit to the first physical erasing unit. Accordingly, when performing the garbage collection process, the memory management circuit 702 may copy the valid data from the first type physical erasing unit to a specific physical erasing unit, and copy the valid data from the second type physical erasing unit to another physical erasing unit, so as to manage the valid data with higher and lower data densities separately.

It should be noted that the operation that performs the garbage collection process based on whether the physical programming units storing the valid data belong to the first or second type physical programming unit and the operation that performs the garbage collection process based on whether the physical erasing unit storing the valid data belongs to the first or second type physical erasing unit may be used separately or together. The invention is not limited thereto.

In an exemplary embodiment, when performing the data writing process, the memory management circuit 702 may write data having a higher data density (e.g. data whose length is decreased after being compressed or coded) to the same physical unit, and write data having a lower data density (e.g. data that are not compressed or coded or data that are compressed or coded to lengthen the data length thereof) to another physical unit. Thus, when copying or writing data to a physical unit, the memory management circuit 702 may determine or set in advance that the physical unit belongs to the first type physical unit or the second type physical unit, so that a corresponding data management rule is applied to management the physical unit.

In this exemplary embodiment, the memory management circuit 702 defines a data management rule (i.e. a first data management rule) for the first type physical unit, and defines another data management rule (i.e. a second data management rule) for the second type physical unit. The term "define" described herein may refer to setting, loading, or activating, and is not limited to the aforesaid actions. For example, when the memory storage device 10 is powered on, the memory management circuit 702 may load the first and second data management rules. If the memory management circuit 702 determines that the first physical unit belongs to the first type physical unit, the memory management circuit 702 then manages the first physical unit based on the first data management rule, such that data stored in the first physical unit conforms to a reliability level (i.e. a first reliability level). Alternatively, if the memory management circuit 702 determines that the first physical unit belongs to the second type physical unit, the memory management circuit 702 then manages the first physical unit based on the second data management rule, such that the data stored in the first physical unit conforms to another reliability level (i.e. a second reliability level). In addition, the second reliability level is higher than the first reliability level.

In this exemplary embodiment, if a reliability level of data in a physical unit is higher, a protection level of the data is higher as well. In other words, since the data density of the second type physical unit is higher than the data density of the first type physical unit, if an error occurs in the data stored in the second type physical unit, a consequence resulting from the error is usually more serious than an error that occurs in the data stored in the first type physical unit. Therefore, in this exemplary embodiment, a mechanism having a higher protection level to data is used when the memory management circuit 702 manages the second type physical unit, and a mechanism having a lower protection level to data is used when the memory management circuit 702 manages the first type physical unit. In addition, the mechanism includes mechanisms for writing, reading, and/or validation of data. For the ease of description, an example described in the following uses the first physical erasing unit as the first physical unit.

In an exemplary embodiment, if the second data management rule is used to manage the first physical erasing unit, the memory management circuit 702 may control the error checking and correcting circuit 708 to generate a lengthwise validation code corresponding to a plurality of physical programming units in the first physical erasing unit. In addition, the lengthwise validation code is used for performing a lengthwise validation to data stored in the physical programming units at the same time. For example, a lengthwise validation code may be used for performing a lengthwise validation to N physical programming units in one or more physical erasing units, where N may be 3, more than 3, or less than 3. When the memory management circuit 702 reads data stored in a plurality of physical programming units protected by the same lengthwise validation code, the memory management circuit 702 also reads the lengthwise validation code, and the error checking and correcting circuit 708 may use the lengthwise validation code to validate an accuracy of the data being read. Alternatively, if the first data management rule is used to manage the first physical erasing unit, the memory management circuit 702 does not control the error checking and correcting circuit 708 to generate the lengthwise validation code, and the error checking and correcting circuit 708 does not perform the lengthwise validation to the data stored in the first physical erasing unit. In an exemplary embodiment, the lengthwise validation code is a Reed-solomon (RS) code, and which is not limited thereby.

In an exemplary embodiment, if the first data management rule is used to manage the first physical erasing unit, the memory management circuit 702 may control the error checking and correcting circuit 708 to generate a lengthwise validation code (i.e. a first lengthwise code) corresponding to the plurality of physical programming units in the first physical erasing unit. If the second data management rule is used to manage the first physical erasing unit, the memory management circuit 702 may control the error checking and correcting circuit 708 to generate another lengthwise validation code (i.e. a second lengthwise validation code). In addition, a data length of the second lengthwise validation code is longer than the data length of the first lengthwise validation code. Thus, if the first physical erasing unit belongs to the first type physical erasing unit, the first lengthwise validation code having the shorter data length may provide basic protection to the data stored in the first physical erasing unit. If the first physical erasing unit belongs to the second type physical erasing unit, the second validation code having the longer data length may provide enhanced protection to the data stored in the first physical erasing unit. In other words, compared with the first lengthwise validation code, the second lengthwise validation code is capable of correcting more error bits.

In an exemplary embodiment, if the first data management rule is used to manage the first physical erasing unit, the memory management circuit 702 may control the error checking and correcting circuit 708 to generate an error correction code (i.e. a first error correction code) corresponding to data to be stored to the first physical erasing unit. If the second data management rule is used to manage the first physical erasing unit, the memory management circuit 702 may control the error checking and correcting circuit 708 to generate another error correction code (i.e. a second error correction code) corresponding to the data to be stored to the first physical erasing unit. Also, a data length of the second error correction code is longer than the data length of the first error correction code. Thus, if the first physical erasing unit belongs to the first type physical erasing unit, the first error correction code having the shorter data length may provide basic protection to the data stored in the first physical erasing unit. If the first physical erasing unit belongs to the second type physical erasing unit, the second error correction code having the longer data length may provide enhanced protection to the data stored in the first physical erasing unit. In other words, compared with the first error correction code, the second error correction code is capable of correcting more error bits. It should be noted that compared with the lengthwise validation code, the error correction code described herein refers to a code for widthwise validation to data. For example, a lengthwise validation code corresponding to respective N-th bits of a plurality of data is used for validating the respective N-th bits of these data, while an error correction code corresponding to an entry of data is used for validating all bits of this entry of data. For example, the error correction code may be a low density parity code (LDPC), a BCH code, a convolutional code, a turbo code, and the invention is not limited thereto.

In an exemplary embodiment, if the first data management rule is used to manage the first physical easing unit, the memory management circuit 702 may use the first physical erasing unit in a predetermined programming mode of the first physical erasing unit. For example, if the first physical erasing unit uses a SLC, MLC, or TLC mode in default, the memory management circuit 702 may use the predetermined programming mode to program each memory cell in the first physical erasing unit. If the second data management rule is used to manage the first physical erasing unit, the memory management circuit 708 uses the first physical erasing unit in a fast page mode. In other words, if the fast page mode is used to use a physical erasing unit, no matter the physical erasing unit in default uses the SLC, MLC, or TLC mode, each memory cell in the physical erasing unit is only used to store one bit. Thus, if the first physical erasing unit belongs to the second physical erasing unit, an error rate of the data stored in the first physical erasing unit may be reduced by reducing the number of bits stored in each memory cell in the first physical erasing unit. It should be noted that the fast page mode described herein is similar to an operation of using the SLC mode to program memory cells. However, the fast page mode is not equivalent to using the SLC mode to program the memory cells. For example, writing voltages used in the fast page mode and the SLC mode may differ, and threshold voltages of a memory cell being programmed by the fast page mode and by the SLC mode may differ as well.

In an exemplary embodiment, if the first data management rule is used to manage the first physical erasing unit, the memory management circuit 702 may set a writing voltage for the first physical erasing unit as one or more predetermined writing voltages. If the second data management rule is used to manage the first physical erasing unit, the memory management circuit 702 may dynamically adjust the writing voltage for the first physical erasing unit based on a using degree of at least one memory cell in the first physical erasing unit. In particular, the using degree of the at least one memory cell described herein may refer to a degree of deterioration of one or more memory cells or an averaged degree of deterioration. For example, the using degree of the at least one memory cell may be evaluated according to a value of deterioration degree of each memory cell or an averaged value of deterioration degree of a plurality of memory cells. Then, based on the using degree of each of or a plurality of memory cells, the memory management circuit 702 may dynamically adjust a writing voltage of each memory cell or writing voltages of a plurality of memory cells. In addition, the value of deterioration degree of each memory cell may be obtained based on parameters such as erasing times, writing times, number of error bits, rate of error bits, reading times of each memory cell or a combination of the parameters. In other words, when programming a memory cell in the first physical erasing unit, an amount of electrons being injected to a charge storage layer of the memory cell may be varied for memory cells with different deterioration degrees. For example, the memory management circuit 702 may send a command sequence instructing a desired writing voltage or instructing to use any suitable writing voltage to the rewritable non-volatile memory module 406. Thus, for the first physical erasing unit belonging to the second type physical erasing unit, even though a data writing speed may be reduced, a data writing stability is effectively ensured.

It should be noted that the first and second data management rules described in the exemplary embodiments above may be used separately or used together. For example, in an exemplary embodiment, if the first data management rule is used to manage a physical erasing unit, the memory management circuit 702 then uses the first lengthwise validation code and the first error correction code to offer basic protection to data stored in the physical erasing unit. If the second data management rule is used to manage another physical erasing unit, the memory management circuit 702 may use the second lengthwise validation code and the second error correction code, together with the fast page mode, to offer enhanced protection to data stored in this physical unit.

Moreover, while the exemplary embodiments above mainly use the physical erasing unit as an example of the physical unit, the physical unit may also be a physical address, a physical sector, a physical programming unit, or a plurality of continuous physical addresses. The invention is not limited thereto. In an exemplary embodiment, a physical unit includes a plurality of physical subunits. In an example using a physical erasing unit as the physical unit, the physical subunit may refer to a physical address, a physical sector, a physical programming unit, or a plurality of continuous physical addresses. Alternatively, in an example using a physical programming unit as the physical unit, the physical subunit may refer to a physical address, a physical sector, or a plurality of continuous physical addresses. Moreover, in an exemplary embodiment, a data density of a physical unit is only related to valid data stored in the physical unit, but not related to invalid data stored in the physical unit.

Figure 11:
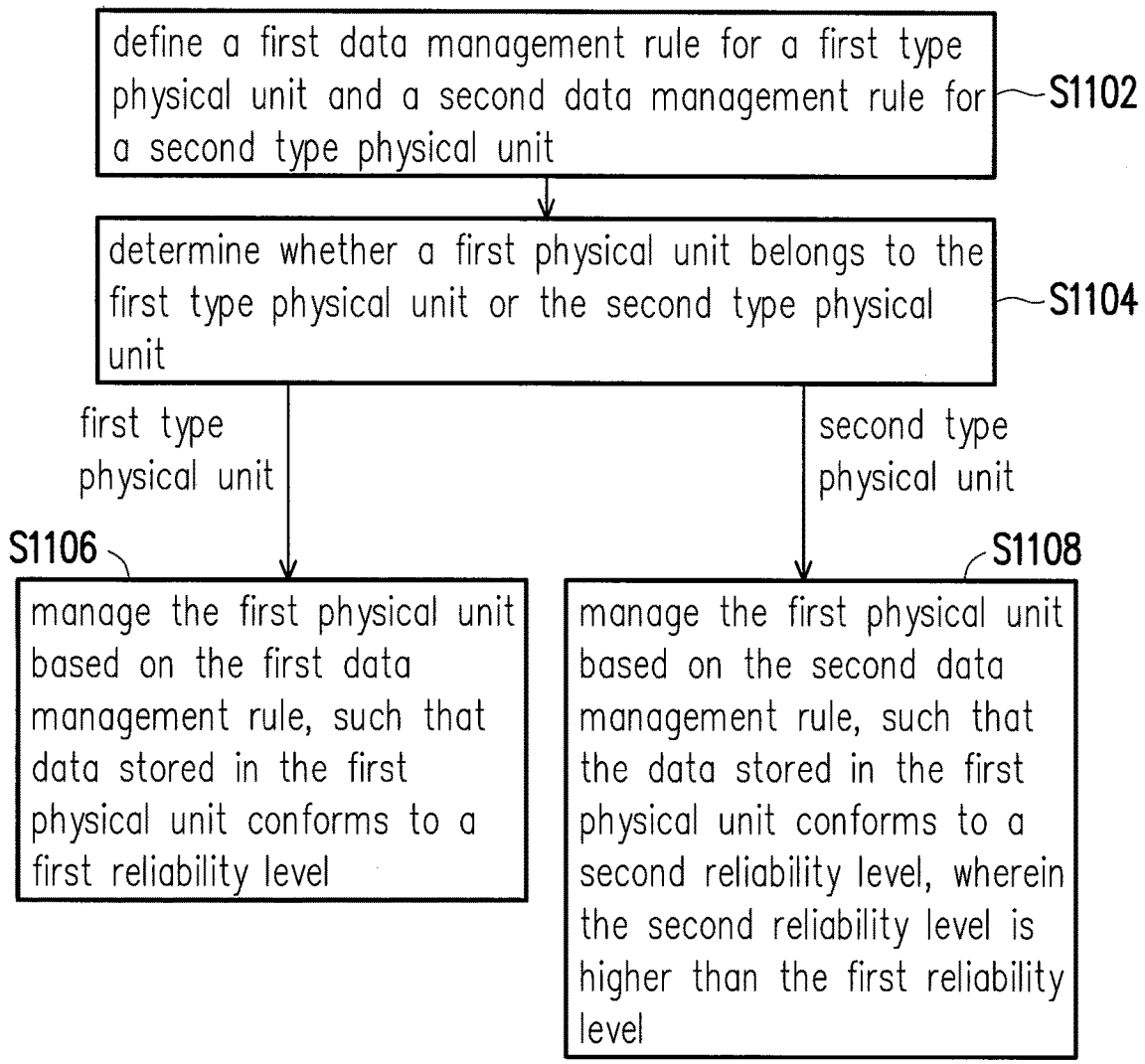
FIG. 11 is a flowchart illustrating a data management method according to an exemplary embodiment of the invention.

FIG. 11 is a flowchart illustrating a data management method according to an exemplary embodiment of the invention. Referring to FIG. 11, at Step S1102, the first data management rule for the first type physical unit and the second data management rule for the second type physical unit are defined. In addition, the first data density of the first type physical unit is lower than the second data density of the second type physical unit. At Step 1104, whether the first physical unit belongs to the first type physical unit or the second type physical unit is determined. If the first physical unit belongs to the first type physical unit, at Step S116, the first physical unit is managed based on the first data management rule, such that the data stored in the first physical unit conforms to the first reliability level. If the first physical unit belongs to the second type physical unit, at Step S1108, the first physical unit is managed based on the second data management rule, such that the data stored in the first physical unit conforms to the second reliability level. In addition, the second reliability level is higher than the first reliability level. It should be noted that details with respect to the steps shown in FIG. 11 are already described above. Thus, no further details in this respect will be reiterated below. It should be noted that the steps of FIG. 11 may be implemented as a plurality of programming codes or circuits. The invention is not limited thereto. Also, the method shown in FIG. 11 may be used with the embodiments above or used separately. The invention is not limited thereto.

In view of the foregoing, in an exemplary embodiment of the invention, if a data density of a physical unit is higher, a protection level of the physical unit is enhanced. If a data density of a physical unit is lower, a protection level of the physical unit remains at the basic level. Thus, the chance that an error occurs in data stored in a physical unit with a higher data density is effectively reduced without seriously lowering an accessing performance of the memory storage device.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for controlling a rewritable non-volatile memory module comprising a plurality of physical units, the memory management method comprising:

defining a first data management rule for a first type physical unit and a second data management rule for a second type physical unit, wherein a first data density of the first type physical unit is lower than a second data density of the second type physical unit;

determining whether a value of a valid count of a first physical unit of the physical units exceeds a threshold value, wherein the valid count relates to a number of logical unit to which the data stored in the first physical unit belongs and the value of the valid count is positively correlated with a data density of the first physical unit;

if the value of the valid count of the first physical unit exceeds the threshold value, managing the first physical unit based on the second data management rule, such that the data stored in the first physical unit conforms to a second reliability level and is protected based on a second protection level; and if the value of the valid count of the first physical unit does not exceed the threshold value, managing the first physical unit based on the first data management rule, such that data stored in the first physical unit conforms to a first reliability level and is protected based on a first protection level, wherein the second reliability level is higher than the first reliability level, and the second protection level is higher than the first protection level, wherein a first number of logical units corresponding to the data stored in the first type physical unit is less than a second number of logical units corresponding to the data stored in the second type physical unit, wherein the first physical unit which is managed based on any one of the first data management rule and the second data management rule is accessible.

2. The memory management method as claimed in claim 1, further comprising:

when performing a garbage collection process, determining whether the first physical unit of the physical units belongs to the first type physical unit or the second type physical unit, wherein the first physical unit is used for storing valid data collected in the garbage collection process.

3. The memory management method as claimed in claim 2, wherein the physical units comprise a non-spare physical unit, the non-spare physical unit comprises a first physical subunit storing valid data, and the memory management method further comprises:

when performing the garbage collection process, determining whether the first physical subunit belongs to a first type physical subunit or a second type physical subunit, or determining whether the non-spare physical unit belongs to the first type physical unit or the second type physical unit;

if the first physical subunit belongs to the first type physical subunit or the non-spare physical unit belongs to the first type physical unit, not copying the valid data stored in the first physical subunit to the first physical unit; and if the first physical subunit belongs to the second type physical subunit or the non-spare physical unit belongs to the second type physical unit, copying the valid data stored in the first physical subunit to the first physical unit.

4. The memory management method as claimed in claim 1, further comprising:

when performing a data writing process requested by a host system, determining whether the first physical unit of the physical units belongs to the first type physical unit or the second type physical unit, wherein the first physical unit is used for storing write data corresponding to the data writing process.

5. The memory management method as claimed in claim 1, wherein the step of managing the first physical unit based on the first data management rule comprises:
not generating a lengthwise validation code corresponding to the first physical unit, wherein the lengthwise validation code is used for performing a lengthwise validation to data in the first physical unit;
wherein the step of managing the first physical unit based on the second data management rule comprises:
generating the lengthwise validation code corresponding to the first physical unit.

6. The memory management method as claimed in claim 1, wherein the step of managing the first physical unit based on the first data management rule comprises:
generating a first lengthwise validation code corresponding to the first physical unit,
wherein the step of managing the first physical unit based on the second data management rule comprises:
generating a second lengthwise validation code corresponding to the first physical unit, wherein the first lengthwise validation code is used for performing a first lengthwise validation to data in the first physical unit, and the second lengthwise validation code is used for performing a second lengthwise validation to the data in the first physical unit, and a length of the second lengthwise validation code is longer than a length of the first lengthwise validation code.

7. The memory management method as claimed in claim 1, wherein the step of managing the first physical unit based on the first data management rule comprises:
generating a first error correction code corresponding to data to be stored to the first physical unit,
wherein the step of managing the first physical unit based on the second data management rule comprises:
generating a second error correction code corresponding to the data to be stored to the first physical unit, wherein a length of the second error correction code is longer than a length of the first error correction code.

8. The memory management method as claimed in claim 1, wherein the step of managing the first physical unit based on the first data management rule comprises:
using the first physical unit in a predetermined programming mode,
wherein the step of managing the first physical unit based on the second data management rule comprises:
using the first physical unit in a fast page mode.

9. The memory management method as claimed in claim 1, wherein the step of managing the first physical unit based on the first data management rule comprises:
setting a writing voltage for the first physical unit as a predetermined writing voltage,
wherein the step of managing the first physical unit based on the second data management rule comprises:
dynamically adjusting the writing voltage of the first physical unit based on a using degree of at least one memory cell in the first physical unit.

10. A memory storage device, comprising:
a connecting interface unit, configured to be coupled to a host system;
a rewritable non-volatile memory module, comprising a plurality of physical units; and
a memory controlling circuit unit, coupled to the connecting interface unit and the rewritable non-volatile memory module,
wherein the memory controlling circuit unit is configured to define a first data management rule for a first type physical unit and a second data management rule for a second type physical unit, wherein a first data density of the first type physical unit is lower than a second data density of the second type physical unit,
wherein the memory controlling circuit unit is further configured to determine whether a value of a valid count of a first physical unit of the physical units is greater than a threshold value, wherein the valid count relates to a number of logical unit to which the data stored in the first physical unit belongs and the value of the valid count is positively correlated with a data density of the first physical unit,
wherein if the value of the valid count of the first physical unit exceeds the threshold value, the memory controlling circuit unit is further configured to manage the first physical unit based on the second data management rule, such that the data stored in the first physical unit conforms to a second reliability level and is protected based on a second protection level,
wherein if the value of the valid count of the first physical unit does not exceed the threshold value, the memory controlling circuit unit is further configured to manage the first physical unit based on the first data management rule, such that data stored in the first physical unit conforms to a first reliability level and is protected based on a first protection level,
wherein the second reliability level is higher than the first reliability level, and the second protection level is higher than the first protection level,
wherein a first number of logical units corresponding to the data stored in the first type physical unit is less than a second number of logical units corresponding to the data stored in the second type physical unit,
wherein the first physical unit which is managed based on any one of the first data management rule and the second data management rule is accessible.

11. The memory storage device as claimed in claim 10, wherein when a garbage collection process is performed, the memory controlling circuit unit is further configured to determine whether the first physical unit of the physical units belongs to the first type physical unit or the second type physical unit, wherein the first physical unit is used for storing valid data collected in the garbage collection process.

12. The memory storage device as claimed in claim 10, wherein when a data writing process requested by the host system is performed, the memory controlling circuit unit is further configured to determine whether the first physical unit of the physical units belong to the first type physical unit or the second type physical unit, wherein the first physical unit is used for storing write data corresponding to the data writing process.

13. The memory storage device as claimed in claim 10, wherein the operation that the memory controlling circuit unit manages the first physical unit based on the first data management rule comprises:
using the first physical unit in a predetermined programming mode,
wherein the operation that the memory controlling circuit unit manages the first physical unit based on the second data management rule comprises:
using the first physical unit in a fast page mode.

14. A memory controlling circuit unit for controlling a rewritable non-volatile memory module comprising a plurality of physical units, the memory controlling circuit unit comprises:
   a host interface, configured to couple to a host system;
   a memory interface, configured to couple to the rewritable non-volatile memory module; and
   a memory management circuit, coupled to the host interface and the memory interface,
   wherein the memory management circuit is configured to define a first data management rule for a first type physical unit and a second data management rule for a second type physical unit, wherein a first data density of the first type physical unit is lower than a second data density of the second type physical unit,
   wherein the memory management circuit is further configured to determine whether a value of a valid count of a first physical unit of the physical units is greater than a threshold value, wherein the valid count relates to a number of logical unit to which the data stored in the first physical unit belongs and the value of the valid count is positively correlated with a data density of the first physical unit,
   wherein if the value of the valid count of the first physical unit exceeds the threshold value, the memory management circuit is further configured to manage the first physical unit based on the second data management rule, such that the data stored in the first physical unit conforms to a second reliability level and is protected based on a second protection level,
   wherein if the value of the valid count of the first physical unit does not exceed the threshold value, the memory management circuit is further configured to manage the first physical unit based on the first data management rule, such that data stored in the first physical unit conforms to a first reliability level and is protected based on a first protection level,
   wherein the second reliability level is higher than the first reliability level, and the second protection level is higher than the first protection level,
   wherein a first number of logical units corresponding to the data stored in the first type physical unit is less than a second number of logical units corresponding to the data stored in the second type physical unit,
   wherein the first physical unit which is managed based on any one of the first data management rule and the second data management rule is accessible.

* * * * *